(12) United States Patent
Chun et al.

(10) Patent No.: US 9,097,537 B2
(45) Date of Patent: Aug. 4, 2015

(54) ELECTRONIC DEVICE AND METHOD FOR DISPLAYING POSITION INFORMATION OF SET DEVICE

(71) Applicant: Samsung Electronics Co., Ltd., Suwon-si, Gyeonggi-do (KR)

(72) Inventors: Jae-Woong Chun, Suwon-si (KR); Nam-Joon Park, Suwon-si (KR); Min-Kyu Lee, Suwon-si (KR); Do-Hyoung Chun, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/083,683

(22) Filed: Nov. 19, 2013

(65) Prior Publication Data

US 2014/0142846 A1 May 22, 2014

(30) Foreign Application Priority Data

Nov. 19, 2012 (KR) .................. 10-2012-0130815

(51) Int. Cl.
*G01S 13/88* (2006.01)
*G01C 21/20* (2006.01)
*G01S 5/00* (2006.01)

(52) U.S. Cl.
CPC ............ *G01C 21/206* (2013.01); *G01S 5/0072* (2013.01)

(58) Field of Classification Search
CPC ....... F24J 2003/089; F24J 3/083; F24J 3/084; F24J 2200/04; Y02E 10/125
USPC ............. 701/23; 165/11.1, 45, 287; 455/418; 702/136, 182, 188
See application file for complete search history.

(56) References Cited

U.S. PATENT DOCUMENTS

| | | | |
|---|---|---|---|
| 8,566,019 B2* | 10/2013 | Yokozawa | 701/408 |
| 8,588,810 B2* | 11/2013 | Dai et al. | 455/456.1 |
| 2008/0042901 A1 | 2/2008 | Smith et al. | |
| 2012/0072106 A1 | 3/2012 | Han et al. | |
| 2013/0137450 A1* | 5/2013 | Dai et al. | 455/456.1 |
| 2013/0148891 A1* | 6/2013 | Yassin | 382/190 |
| 2013/0157682 A1* | 6/2013 | Ling | 455/456.1 |
| 2013/0205306 A1* | 8/2013 | Kelly | 719/318 |
| 2013/0281023 A1* | 10/2013 | Madanarajagopal et al. | 455/41.3 |
| 2013/0346229 A1* | 12/2013 | Martin et al. | 705/26.3 |
| 2014/0087707 A1* | 3/2014 | Gustafsson et al. | 455/418 |
| 2014/0101169 A1* | 4/2014 | Kurata et al. | 707/748 |

* cited by examiner

*Primary Examiner* — McDieunel Marc
(74) *Attorney, Agent, or Firm* — Jefferson IP Law, LLP

(57) ABSTRACT

An electronic device and method for displaying position information of a set device are provided. The method of operating a first electronic device, which currently communicates with a second electronic device, includes receiving position tracking information from the second electronic device, analyzing the received position tracking information to determine whether an atmospheric pressure within a preset range is sensed, the preset range including an atmospheric pressure sensed by the second electronic device, and, when the atmospheric pressure in the preset range is sensed, comparing position information currently received and the received position tracking information to display position information about the second electronic device.

32 Claims, 11 Drawing Sheets

ELECTRONIC DEVICE AND METHOD FOR DISPLAYING POSITION INFORMATION OF SET DEVICE

CROSS-REFERENCE TO RELATED APPLICATION(S)

This application claims the benefit under 35 U.S.C. §119 (a) of a Korean patent application filed on Nov. 19, 2012 in the Korean Intellectual Property Office and assigned Serial No. 10-2012-0130815, the entire disclosure of which is hereby incorporated by reference.

TECHNICAL FIELD

The present disclosure relates to an electronic device and method for displaying position information on a set device.

BACKGROUND

In an electronic device, a method using a satellite navigation system is generally used for determining a position of a set device. For example, an electronic device uses a satellite navigation system such as a Global Positioning System (GPS) or a Global Navigation Satellite System (GLONASS) to precisely determine a position of a set device.

However, the above described satellite navigation system is difficult to be used indoors or in a place where a satellite signal is weak. Accordingly, although indoor positioning systems have been developed, in order to receive position information by using an indoor electronic device, a room should be equipped with a particular device for indoor positioning, or positioning infrastructure is required to be constructed in advance in a room where positioning is to be performed. However, it would be time and cost prohibitive to equip all the indoor environments with these kinds of devices.

Accordingly, when an electronic device and a set device are located indoors, or in a place where the satellite signal is weak, there is a need for a method and apparatus for precisely receiving position information on the set device by using the electronic device without constructing infrastructure in advance.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages below. Accordingly, an aspect of the present disclosure is to provide an apparatus and method for determining position information of a set device even in a place, such as a room, that a satellite signal is too weak to use a satellite navigation system.

Another aspect of the present disclosure is to provide a device and method for precisely determining position information of a set device without constructing infrastructure in advance to improve economy.

Another aspect of the present disclosure is to provide a device and method for receiving sensor information and Wireless Fidelity (WiFi) scan information from a set device and precisely determining a movement path of the set device to enhance user's convenience.

Another aspect of the present disclosure is to provide a device and method for analyzing sensor information received from a set device to precisely determine whether a set device is located on the same floor and specific transportation when the set device is located on another floor.

In accordance with an aspect of the present invention, a method of operating a first electronic device, which currently communicates with a second electronic device is provided, The method includes receiving position tracking information from the second electronic device, analyzing the received position tracking information to determine whether a sensor information for the second electronic device's vertical position estimation within a preset range is sensed, the preset range including sensor information for the second electronic device's vertical position estimation and when the atmospheric pressure in the preset range is sensed, comparing position information currently received and the received position tracking information to display position information about the second electronic device.

The method may further include confirming that the second electronic device is beyond a communication coverage area where direct communication with the second electronic device is performed, and receiving position tracking instructions for tracking a position of the second electronic device.

The position tracking information may include sensor information sensed by the second electronic device and WiFi information.

The sensor information may include at least one of atmospheric information, angular velocity information, acceleration information, altitude information of Pedestrian Dead Reckoning (PDR) and time information, which are sensed by the second electronic device, the angular velocity information and the acceleration information being used for determining when the second electronic device moves between floors.

The WiFi scan information may include at least one of information on at least one Access Point (AP), at least one AP identifying factor, signal strength and time information, scanned by the second electronic device.

The at least one AP identifying factor may include at least one of a Basic Service Set Identifier (BSSID), a Service Set IDentifier (SSID) and a Media Access Control (MAC) address of the AP.

The determining of whether the atmospheric pressure within the preset range is sensed may include confirming the atmospheric pressure included in sensor information from among the received position tracking information, comparing the confirmed atmospheric pressure and the sensed atmospheric pressure, and determining whether an atmospheric pressure within the preset range is sensed, the preset range including the confirmed atmospheric pressure.

The method may further include confirming sensor information from among the received position tracking information when the atmospheric pressure within the preset range is not sensed, the preset range including the atmospheric pressure sensed by the second electronic device, and confirming the sensor information to display at least one of angular velocity information, acceleration information and time information sensed by the second electronic device.

The comparing of the position information may include sensing atmospheric pressure within the preset range, the preset range including the atmospheric pressure sensed by the second electronic device, comparing WiFi information from among the position tracking information received from the second electronic device and position information received from at least one AP, and displaying movement track information indicating whether the second electronic device moves from a current position and time information when the second electronic device moves from the current position.

The position information may include at least one of information on at least one scanned AP, at least one AP identifying factor, signal strength, and time information.

The at least one AP identifying factor may include at least one of a BSSID, an SSID and an MAC address of the AP.

In accordance with another aspect of the present invention, a method of operating a second electronic device which currently communicates with a first electronic device is provided. The method includes determining whether the second electronic device is beyond a communication coverage area where direct communication with the first electronic device is performed, calling stored position tracking information when the second electronic device is determined to be beyond the communication coverage area, and transmitting the called position tracking information to the first electronic device.

The position tracking information may include sensed sensor information and WiFi scan information.

The sensor information may include at least one of atmospheric pressure information, angular velocity information, acceleration information, and time information.

The WiFi scan information comprises at least one of information on at least one AP, at least one AP identifying factor, signal strength, and time information.

The at least one identifying factor may include at least one of a BSSID, an SSID, and an MAC address of the AP.

In accordance with another aspect of the present invention, a device of a first electronic device which currently communicates with a second electronic device is provided, The device includes a communication module receiving position tracking information from the second electronic device, a processor unit analyzing the received position tracking information to determine whether an atmospheric pressure within a preset range is sensed, the preset range including an atmospheric pressure sensed by the second electronic device, and a touch screen comparing position information currently received and the received position tracking information to display position information about the second electronic device, when the atmospheric pressure within the preset range is sensed.

The processor unit may confirm the second electronic device to be beyond a communication coverage area where direct communication with the second electronic device is performed.

The position tracking information may include sensor information sensed by the second electronic device and WiFi scan information.

The sensor information may include at least one of atmospheric pressure information, angular velocity information, acceleration information, altitude information of PDR and time information sensed by the second electronic device, the angular velocity information and the acceleration information being used for determining when the second electronic device moves between floors.

The WiFi scan information may include at least one of information on at least one AP, at least one AP identifying factor, signal strength, and time information, scanned by the second electronic device.

The at least one AP identifying factor may include at least one of a BSSID, an SSID and a MAC address of the AP.

The processor unit may confirm atmospheric pressure information included in sensor information from among the received position tracking information, compares the confirmed atmospheric pressure and the sensed atmospheric pressure, and determines whether atmospheric pressure within the preset range is sensed, the preset range including the confirmed atmospheric pressure.

The processor unit may confirm sensor information from among the received position tracking information, when the atmospheric pressure within the preset range is not sensed, the preset including the atmospheric pressure sensed by the second electronic device, and the touch screen may confirm the sensor information to display at least one of angular velocity information, acceleration information and time information sensed by the second electronic device.

The processor unit may sense atmospheric pressure within the preset range, the preset range including the atmospheric pressure sensed by the second electronic device, and compare WiFi information from among the position tracking information received from the second electronic device and position information received from at least one AP, and the touch screen may display movement track information indicating whether the second electronic device moves from a current position and time information when the second electronic device moves from the current position.

The position information may include at least one of information on at least one scanned AP, at least one AP identifying factor, signal strength, and time information.

The at least one AP identifying factor may include at least one of a BSSID, an SSID and an MAC address of the AP.

In accordance with another aspect of the present invention, a device of a second electronic device which currently communicates with a first electronic device is provided. The device includes a processor unit determining whether the second electronic device is beyond a communication coverage area where direct communication with the first electronic device is performed, and calling stored position tracking information when it is determined the second electronic device is beyond the communication coverage area, and a communication module transmitting the called position tracking information to the first electronic device.

The position tracking information may include sensed sensor information and WiFi scan information.

The sensor information may include at least one of atmospheric pressure information, angular velocity information, acceleration information, and time information.

The WiFi scan information may include at least one of information on at least one AP, at least one AP identifying factor, signal strength, and time information.

The at least one AP identifying factor may include at least one of a BSSID, an SSID, and an MAC address of the AP.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other objects, features, and advantages of various embodiments of the present disclosure will become more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1A:
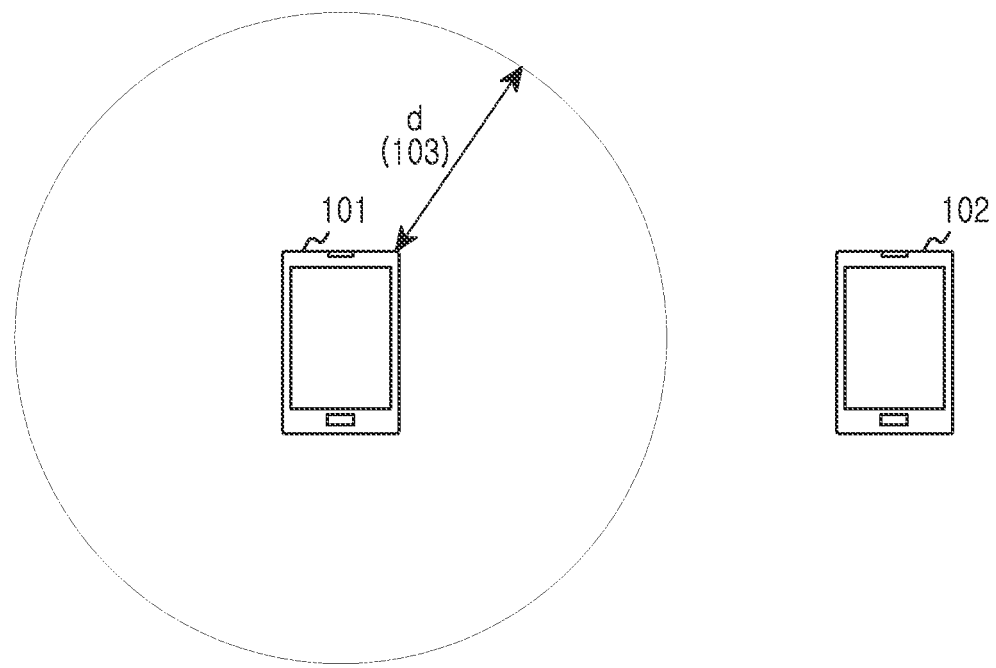
FIGS. 1A and 1B are views entirely illustrating an electronic device for displaying position information on a set device according to an embodiment of the present disclosure.
Figure 1B:
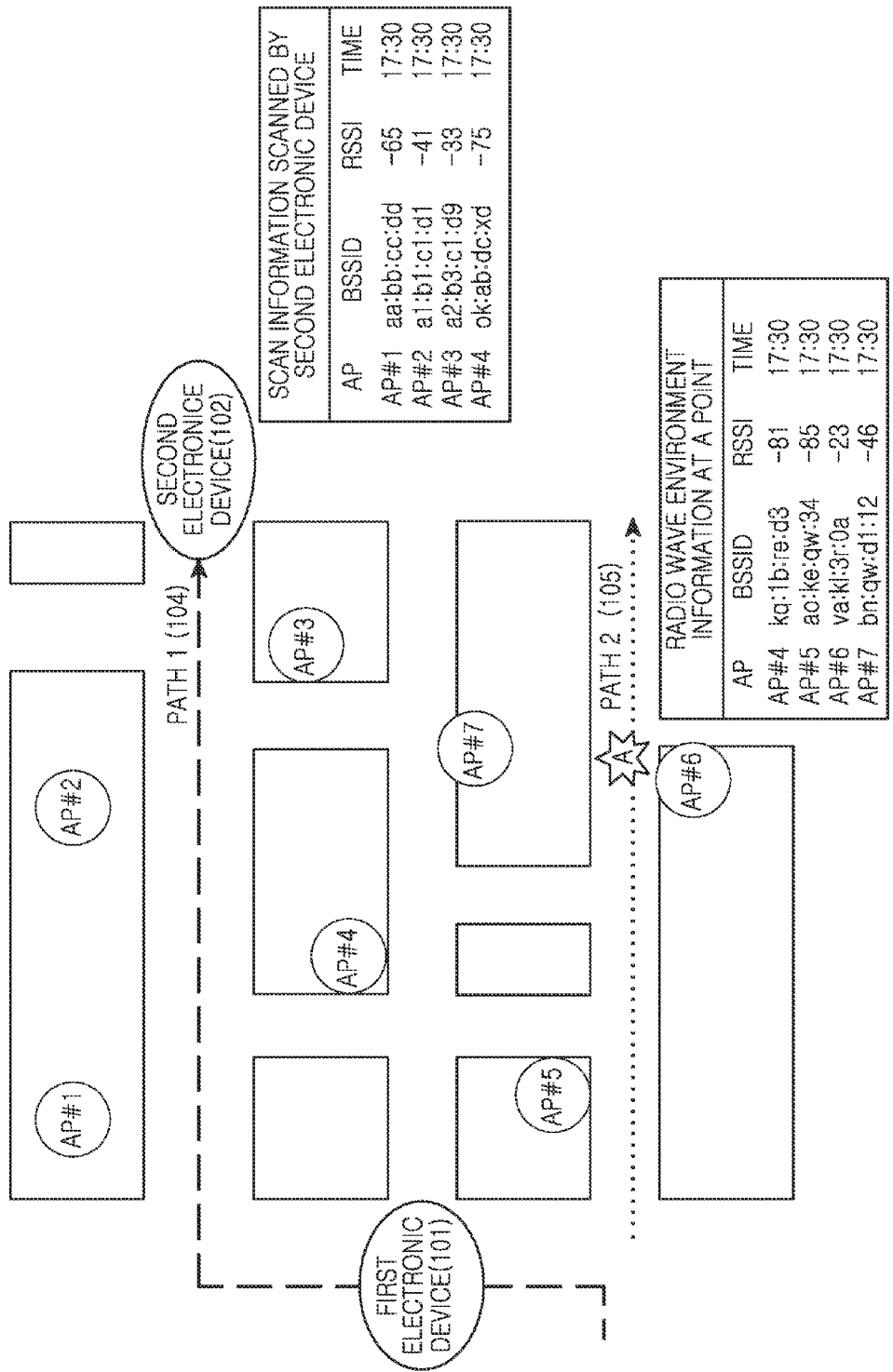

FIGS. 1A and 1B are views entirely illustrating an electronic device for displaying position information on a set device according to an embodiment of the present disclosure.

First, as shown in FIG. 1A, a first electronic device 101 is performing communication with a second electronic device 102. In detail, the first electronic device 101 communicates with the second electronic device 102 to be able to transmit and receive any information to and from the second electronic device 102. For example, the first electronic device 101 and the second electronic device 102 can mutually transmit and receive information by performing near field communication within a communication coverage area (d) 103 thereof. Hereinafter, it is assumed that a distance between the first and second electronic devices 101 and 102 exceeds the communication coverage area 103, and the first and second electronic devices 101 and 102 currently are located inside a multi-floored building. It is also assumed that Global Positioning System (GPS) information is not able to be received inside the building where the first and second electronic devices 101 and 102 are located.

First, after the first electronic device 101 confirms that the second electronic device 102 is beyond the communication coverage area 103 where it can communicate with the second electronic device 102, it may receive position tracking instructions for tracking a position of the second electronic device 102. Thereafter, the first electronic device 101, which receives the position tracking instructions, may receive position tracking information from the second electronic device 102. In detail, the first electronic device 101 may receive the position tracking information from the second electronic device 102 by using Wireless Fidelity (WiFi), $3^{rd}$ Generation (3G), and $4^{th}$ Generation (4G) networks. Here, the position tracking information may be defined as sensor information sensed by the second electronic device 102 and WiFi scan information. In detail, the first electronic device 101 may receive, from the second electronic device 102, at least one of atmospheric pressure information, angular velocity information, acceleration information and time information, which are sensor information sensed by the second electronic device 102.

Here, the first electronic device 101 may confirm atmospheric pressure information from the second electronic device 102 to display information on a floor where the second electronic device 102 is currently located. In detail, the first electronic device 102 measures atmospheric pressure and compares information on the measured atmospheric pressure and the atmospheric pressure information received from the second electronic device 102 to determine whether the first electronic device 101 is on the same floor with the second electronic device 102. Here, the first electronic device 101 may confirm angular velocity information, altitude information of Pedestrian Dead Reckoning (PDR) and acceleration information received from the second electronic device 102 to estimate a movement path and transportation of the second electronic device 102. In detail, the first electronic device 101 can confirm the angular velocity information, altitude information of PDR and the acceleration information sensed by the second electronic device 102, and estimate a movement path and transportation to another floor in the building. For example, the first electronic device 101 confirms angular velocity information, altitude information of PDR and acceleration information received from the second electronic device 102 to determine whether the second electronic device 102 moves to another floor by an elevator or by stairs.

In addition, the first electronic device 101 may receive at least one of information on at least one Access Point (AP), at least one AP identifying factor, signal strength and time information, which are WiFi scan information scanned by the second electronic device 102. Here, the at least one AP identifying factor may be defined as at least one of a Basic Service Set IDentifier (BSSID), a Service Set IDentifier (SSID), and a Media Access Control (MAC) address of the AP. In detail, the first electronic device 101 receives at least one of information on at least one AP, at least one AP identifying factor, signal strength, and time information, which are scanned by the second electronic device 102, to confirm position information on the second electronic device 102. First, the first electronic device 101 may compare position information received from at least one AP and WiFi scan information from among position tracking information received from the second electronic device 102. Here, the position information that the first electronic device 101 receives from the at least one AP may be defined as at least one of information on at least one scanned AP, at least one AP identifying factor, signal strength, and time information. Namely, the first electronic device 101 may compare position information received from at least one AP and WiFi scan information received from the second electronic device 102 to determine a path having high correlation. Referring to FIG. 1B for detailed description, when the second electronic device 102 is assumed to move along a path 1 104, WiFi information scanned during movement along the path 1 104 is different from information scanned along path 2 105. Accordingly, this information is unique information capable of being obtained only along the path 1 104 and may be consequentially utilized as information for describing the path 1 104. Accordingly, it can be seen that only when position tracking information periodically scanned by the second electronic device 102 is transmitted to the first electronic device 101, on the basis of which the first electronic device 101 moves along the path 1 104, WiFi environment of the first electronic device 101 becomes similar to that transmitted by the second electronic device 102. Consequentially, the first electronic device 101 can know the path 1 104 as a path having a high correlation, and may track a path along which the second electronic device 102 moves.

Thereafter, the first electronic device 101 may display movement track information and time information on the second electronic device 102 on a touch screen. In detail, the first electronic device 101 may display on the touch screen movement track information indicating whether the second electronic device 102 moves from a current position, and movement time information in a case where the second electronic device 102 moves from the current position. For example, the first electronic device 101 may display on the touch screen thereof whether the second electronic device 102 moves to the present position, and movement time together. Accordingly, a user using the first electronic device 101 has an advantage in that he or she can confirm position information on the second electronic device 102, which is beyond near field communication coverage area.

In a room where GPS position information is not received, position information between two electronic devices is not typically and mutually confirmed without constructing additional infrastructure. In detail, the above described satellite navigation system is difficult to be used in a place, such as a room, where a satellite signal is weak. Accordingly, an indoor positioning system has been developed, but, in order to receive position information by using an indoor electronic device, an additional device is required to be added to the existing electronic device and a positioning infrastructure is required to be constructed in advance, which are economically burdensome. However, the first electronic device 101 according to the present disclosure may receive position tracking information on the second electronic device 102 from the second electronic device 102 even in a room where an infrastructure is not constructed in advance, and confirm a movement path in a case where the first and second electronic devices 101 and 102 are located on different floors.

Figure 2A:
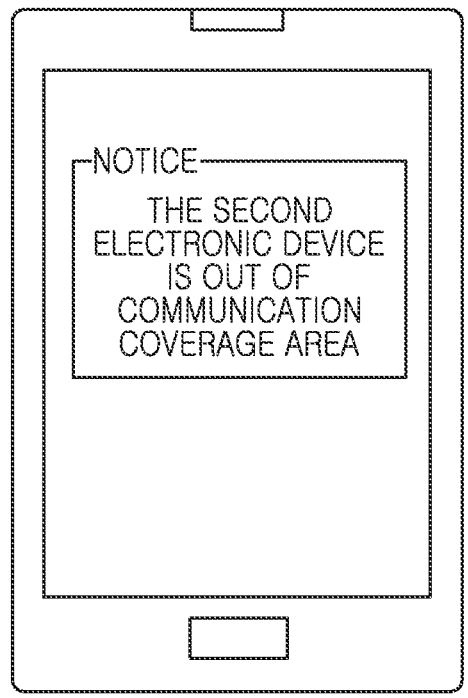
FIGS. 2A and 2B illustrate an example of receiving position tracking instructions for tracking a position of a set electronic device according to an embodiment of the present disclosure.
Figure 2B:
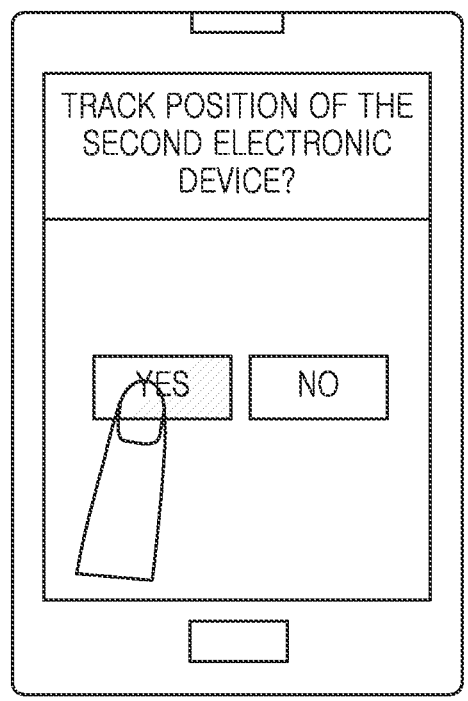

FIGS. 2A and 2B illustrate an example of receiving position tracking instructions for tracking a position of a set electronic device according to an embodiment of the present disclosure. First, a first electronic device is communicating with a second electronic device. In detail, the first electronic device communicates with the second electronic device to transmit and receive any information to and from the second electronic device. For example, the first and second electronic devices mutually transmit and receive information by performing near field communication within a communication coverage area. When a distance between the first and second electronic devices is beyond a set communication coverage area, the first electronic device may display on a touch screen thereof a notice message indicating that the second electronic device is beyond the communication coverage area. For example, as shown in FIG. 2A, the first electronic device may display on the touch screen thereof a notice message such as, "the second electronic device is beyond a communication coverage area". Accordingly, a user using the first electronic device can confirm that the second electronic device is located beyond a communication coverage area where near field communication can be performed. For example, it is assumed that parents and their child are shopping in a 12 floor department store where position information is insufficiently received by using a satellite navigation system, the parents have the first electronic device, and the child has the second electronic device. It is also assumed that the first and second electronic devices are connected to perform near field communication. In the above described assumption, when an inattentive child is far from the parents at a position that is beyond a communication coverage area where near field communication can be performed, the first electronic device displays on the touch screen thereof a notice message indicating that the second electronic device is beyond the communication coverage area.

Thereafter, a notice message querying whether to track a position of the second electronic device may be displayed on the touch screen of the first electronic device. In detail, after confirming that the second electronic device is beyond the communication coverage area, the first electronic device may display a notice message for receiving position tracking instructions for tracking a position of the second electronic device. For example, as shown in FIG. 2B, the first electronic device may display on the touch screen thereof a notice message such as, "track position of the second electronic device?" Here, when receiving the instructions for tracking a position of the second electronic device, the first electronic device can track the position of the second electronic device. In the above described assumption, the parents having the first electronic device may input instructions to the first electronic device for allowing the first electronic device to track the position of the second electronic device in order to track a position of the child having the second electronic device.

Figure 3:
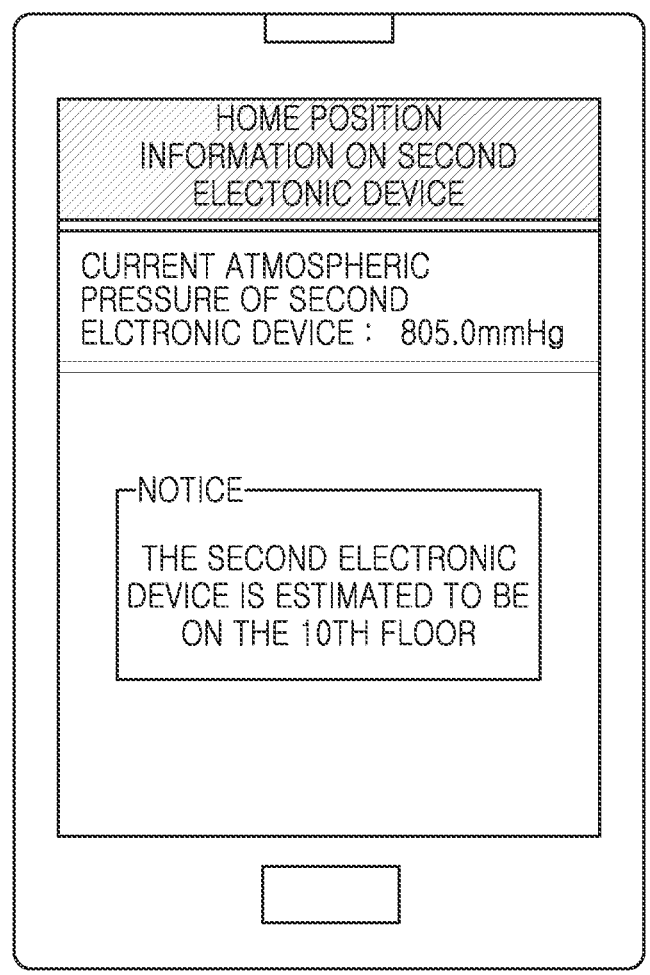
FIG. 3 illustrates an example of displaying floor position information on another set electronic device according to an embodiment of the present disclosure.

FIG. 3 illustrates an example of displaying floor position information on another set electronic device according to an embodiment of the present disclosure. First, the first and second electronic devices are connected to perform near field communication. It is assumed that near field communication distance between them is 50 meters. It is also assumed that parents and a child have respectively the first and second electronic devices, they are in a certain building where position information is not received by a satellite navigation system, and they are shopping on an $8^{th}$ floor. In the above described assumptions, while the parents and the child are shopping together on the $8^{th}$ floor, the inattentive child is beyond the 50 meters of a communication coverage area where near field communication can be performed, the first electronic device may display on the touch screen thereof a notice message that the second electronic device is beyond the coverage area. Thereafter, when receiving instructions for tracking a position of the second electronic device, the first electronic device may receive position tracking information on the second electronic device through WiFi, 3G, and 4G networks.

The first electronic device having received the position information on the second electronic device may analyze the received position information to determine whether an atmospheric pressure within a preset range is sensed, the preset range including an atmospheric pressure sensed by the second electronic device. In detail, the first electronic device confirms the atmospheric pressure information included in sensor information from among the position tracking information received from the second electronic device to determine whether the atmospheric pressure within the preset range is sensed, the preset range including the atmospheric pressure sensed by the second electronic device. Here, the atmospheric pressure information indicates the atmospheric pressure information sensed by the second electronic device, and the first electronic device may compare the self-sensing atmospheric pressure and the atmospheric pressure by the second electronic device. Then, the first electronic device may determine whether the atmospheric pressure within the preset range is sensed, the preset range including the atmospheric pressure sensed by the second electronic device.

As described above, the reason why the first electronic device determines whether the atmospheric pressure within the preset range is sensed, is for determining whether the first and second electronic devices are being on the same floor. In detail, it is intended that the atmospheric pressures sensed by the first and second electronic devices are compared in real time to confirm floor position information on the second electronic device. In the above described example, the first electronic device may analyze atmospheric pressure information included in the sensor information from among the position tracking information received from the second electronic device and display the atmospheric pressure sensed by the second electronic device and floor position information on position of the second electronic device. Namely, the first electronic device may display on a touch screen thereof a notice message that atmospheric pressure currently sensed by the second electronic device is "805.0 mmHg" and "the second electronic device is estimated to be currently located on the $10^{th}$ floor". Accordingly, parents confirming their child to be out of sight can move from the current $8^{th}$ floor to the $10^{th}$ floor.

Figure 4A:
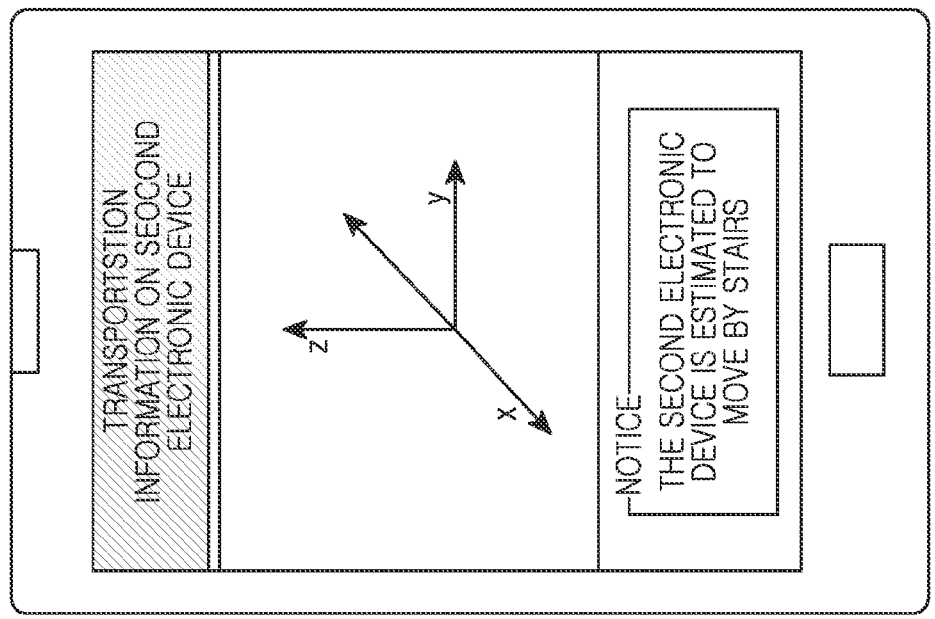
FIGS. 4A and 4B illustrate an example of displaying transportation information on another set electronic device according to an embodiment of the present disclosure.
Figure 4B:
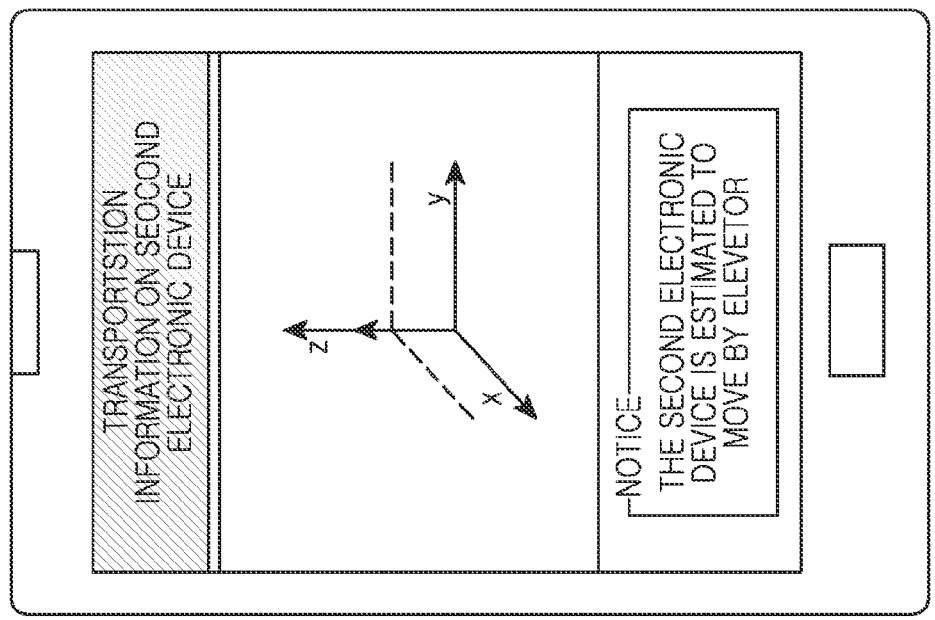

FIGS. 4A and 4B illustrates an example of displaying transportation information on another set electronic device according to an embodiment of the present disclosure. First, it is assumed that first and second electronic devices are connected to perform near field communication, and a distance that the near field communication can be performed is 50 meters. It is also assumed that parents and a child have respectively the first and second electronic devices, they are in a certain building where position information is not received by a satellite navigation system, and they are shopping on the $8^{th}$ floor. In the above described assumptions, while the parents and the child are shopping together on the $8^{th}$ floor, the inattentive child is beyond the 50 meters of a communication coverage area where near field communication can be performed, the first electronic device may display on the touch screen thereof a notice message that the second electronic device is beyond the communication coverage area. Thereafter, when receiving instructions for tracking a position of the second electronic device, the first electronic device may receive position tracking information on the second electronic device through WiFi, 3G, and 4G networks.

The first electronic device having received the position information on the second electronic device may analyze the received position information to determine whether an atmospheric pressure within a preset range is sensed, the preset range including an atmospheric pressure sensed by the second electronic device. It is assumed that the first electronic device analyzes position tracking information received from the second electronic device and determines that the atmospheric pressure within the preset range is not sensed, the preset range including the atmospheric pressure sensed by the second electronic device. In the above described assumption, the first electronic device may analyze atmospheric pressure included in sensor information from among the position tracking information received from the second electronic device to display the atmospheric pressure sensed by the second electronic device and information on floor position where the second electronic device is currently located. Thereafter, when the first electronic device receives an input for displaying transportation information on the second electronic device, the first electronic device may display on a touch screen thereof transportation information on the second electronic device. In detail, the first electronic device analyzes angular velocity information and acceleration information sensed by the second electronic device from among the sensor information received from the second electronic device to display on the touch screen the transportation information on the second electronic device. For example, as shown in FIGS. 4A and 4B, the first electronic device may display on the touch screen thereof information on transportation by which the second electronic device located on the $8^{th}$ floor moves to another floor. Namely, the first electronic device may display a notice message such as "the second electronic device is estimated to move by an elevator" or "the second electronic device is estimated to move by stairs". In detail, when the second electronic device is determined to move only along a Z axis in a spatial coordinate system from a result that the first electronic device analyzes acceleration information on the second electronic device, the second electronic device may be determined to move by elevator from the $8^{th}$ floor to another floor. Furthermore, the second electronic device is determined to move between any one of an X axis and a Y axis, a Y axis and a Z axis, and a Z axis and an X axis in a spatial coordinate system from a result that the first electronic device analyzes angular velocity information on the second electronic device, the second electronic device may be determined to move by stairs from the $8^{th}$ floor to another floor.

Figure 5:
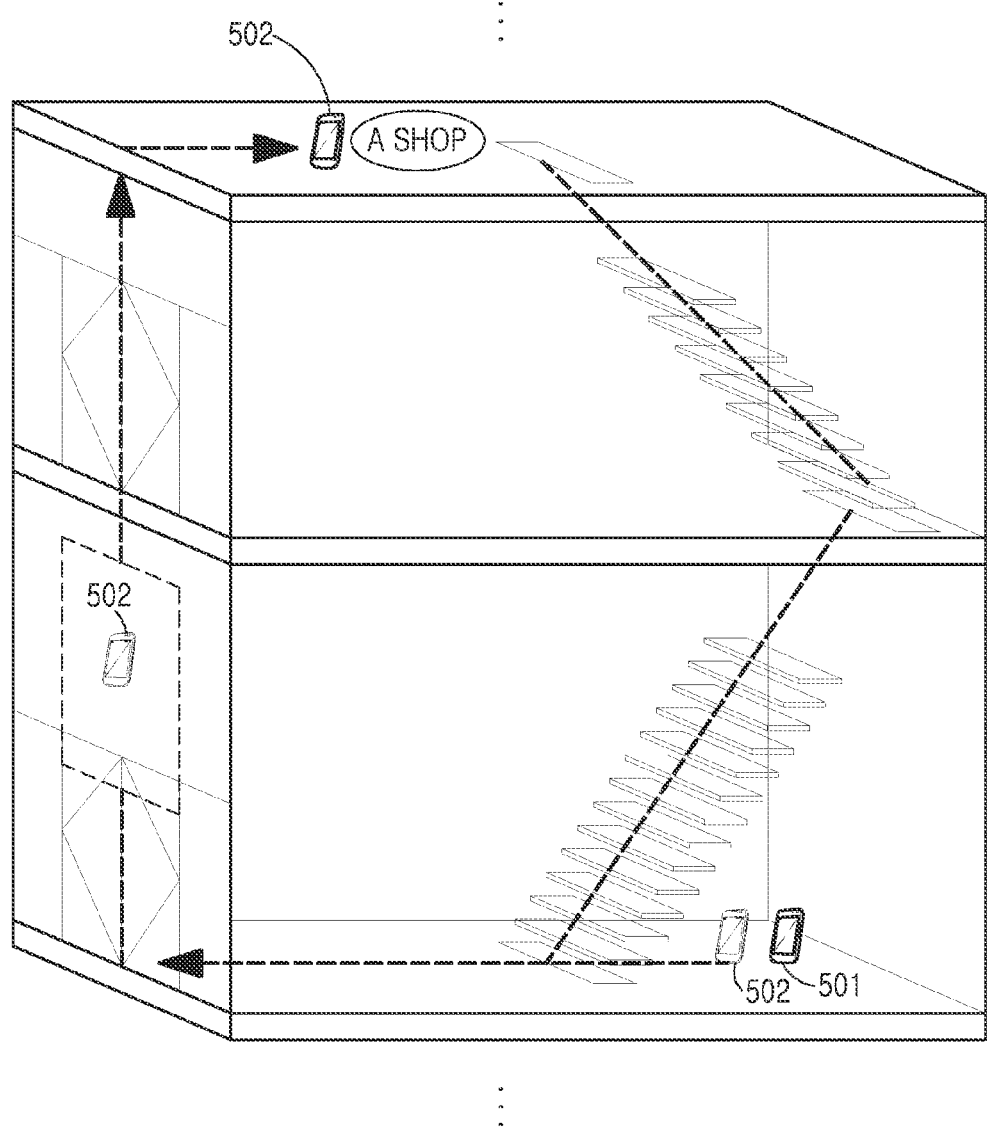
FIG. 5 illustrates an example of confirming transportation of another set electronic device according to an embodiment of the present disclosure.

FIG. 5 illustrates an example of confirming transportation of another set electronic device according to an embodiment of the present disclosure. First, it is assumed that first and second electronic devices 501 and 502 are connected to perform near field communication, and a distance that the near field communication can be performed is 50 meters. It is also assumed that a guardian and an intellectually disabled person have respectively the first and second electronic devices, they are in a certain building where position information is not received by a satellite navigation system, and they are shopping on an $8^{th}$ floor. In the above described assumptions, while the guardian and the intellectually disabled person are shopping together on the $8^{th}$ floor, the inattentive and intellectually disabled person beyond the 50 meters of a communication coverage area where near field communication can be performed, the first electronic device 501 may display on the touch screen thereof a notice message that the second electronic device 502 is beyond the communication coverage area. Thereafter, when receiving instructions for tracking a position of the second electronic device, the first electronic device 501 may receive position tracking information on the second electronic device 502 through WiFi, 3G, and 4G networks.

The first electronic device 501 having received the position information on the second electronic device 502 may analyze the received position information to determine whether an atmospheric pressure within a preset range is sensed, the preset range including an atmospheric pressure sensed by the second electronic device 502. In detail, the first electronic device 501 may confirm the atmospheric pressure information included in sensor information from among position tracking information received from the second electronic device 502 to determine whether the atmospheric pressure within the preset range is sensed. It is assumed that the first electronic device 501 analyzes the position tracking information received from the second electronic device 502 and determines that the atmospheric pressure within the preset range is not sensed, the preset range including the atmospheric pressure sensed by the second electronic device 502. In the above described assumption, the first electronic device 501 may analyze atmospheric pressure included in the sensor information from among the position tracking information received from the second electronic device 502 to display the atmospheric pressure sensed by the second electronic device 502 and information on floor position where the second electronic device 502 is currently located. In the above described assumption, the first electronic device 501 may display on a touch screen thereof a notice message indicating floor position information that the second electronic device 502 currently is located on the $10^{th}$ floor.

Thereafter, when the first electronic device 501 receives an input for displaying transportation information on the second electronic device 502, the first electronic device 501 may display on a touch screen thereof transportation information on the second electronic device. In detail, the first electronic device 501 analyzes angular velocity information and acceleration information sensed by the second electronic device 502 in the sensor information received from the second electronic device 502 to display on the touch screen transportation information on the second electronic device 502. For example, as shown in FIG. 5, the first electronic device 501 may display on the touch screen thereof transportation information that the second electronic device 502 located on the $8^{th}$ floor moves to the $10^{th}$ floor. Namely, the first electronic device 501 may display a notice message such as "the second electronic device is estimated to move by an elevator" or "the second electronic device is estimated to move by stairs". In detail, when the second electronic device 502 is determined to move only along a Z axis in a spatial coordinate system from a result that the first electronic device 501 analyzes the acceleration information on the second electronic device 502, the second electronic device 502 may be determined to move by elevator from the $8^{th}$ floor to the $10^{th}$ floor. Furthermore, the second electronic device 502 is determined to move between any one of an X axis and a Y axis, a Y axis and a Z axis, and a Z axis and an X axis in a spatial coordinate system from a result that the first electronic device 501 analyzes the angular velocity information on the second electronic device 502, the second electronic device 502 may be determined to move by stairs from the $8^{th}$ floor to the $10^{th}$ floor.

Referring to FIG. 5, the first electronic device 501 may display on the touch screen thereof information that the second electronic device 502 is currently on the $10^{th}$ floor, and transportation by which the second electronic device 502 moves from the $8^{th}$ floor to the $10^{th}$ floor is an elevator or stairs. Accordingly, the guardian having the first electronic device 501 can confirm a position and transportation of the intellectually disabled person having the second electronic device 502. Namely, the guardian having the first electronic device 501 can search for a specific movement path according to the confirmed transportation information in order to determine the intellectually disabled person having the second electronic device 502. For example, if the first electronic device 501 displays on the touch screen that the second electronic device 502 moves to the $10^{th}$ floor by an elevator, the guardian having the first electronic device 501 can move to the $10^{th}$ floor by an elevator. Namely, since a movement path of a person is fixed inside a building, it is the most proper way to determine a position of the second electronic device 502 along the movement path that the second electronic device has moved.

Figure 6:
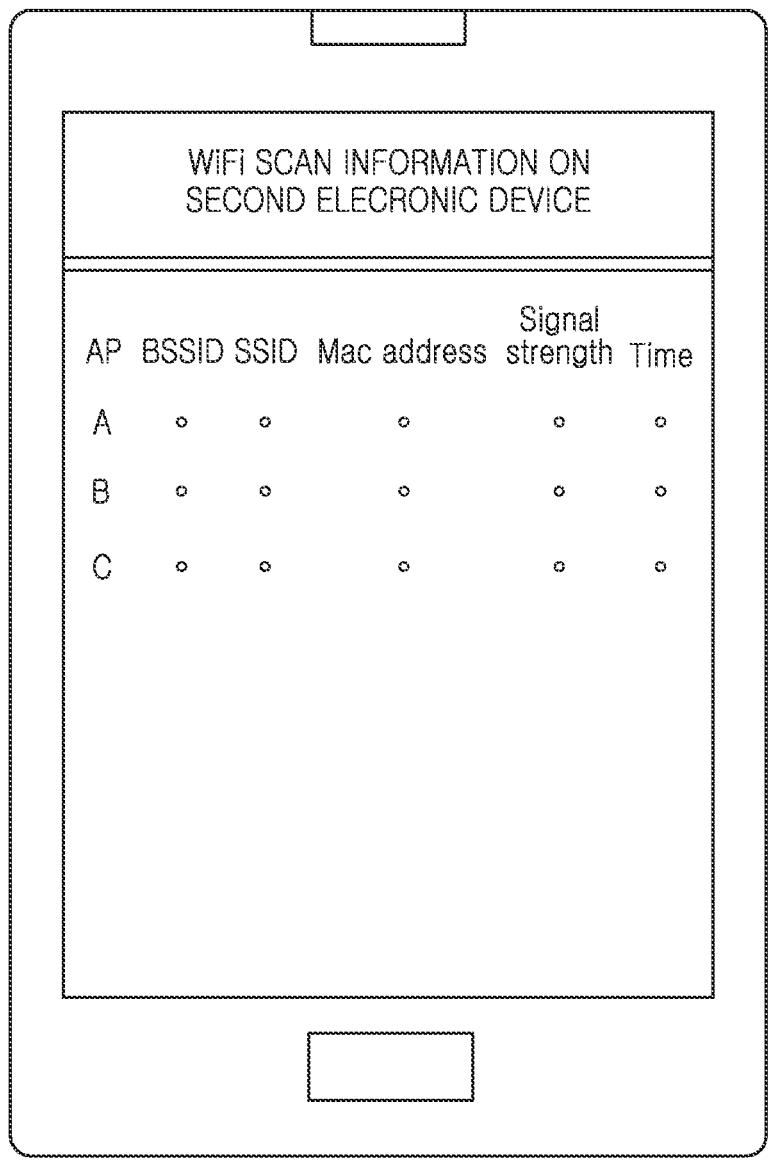
FIG. 6 illustrates and example of displaying WiFi scan information on another set electronic device according to an embodiment of the present disclosure.

FIG. 6 illustrates an example of displaying WiFi scan information on a set electronic device according to an embodiment of the present disclosure. First, a first electronic device analyzes position tracking information received from a second electronic device to determine whether an atmospheric pressure within a preset range is sensed, the preset range including atmospheric pressure sensed by the second electronic device. Then, when sensing atmospheric pressure within the preset range, the first electronic device may display on a touch screen thereof WiFi scan information from among position tracking information received from the second electronic device. Here, the WiFi scan information may be defined as at least one of a BSSID, an SSID, a MAC address, signal strength, and time information, which are received from at least one AP. In detail, the first electronic device may confirm the WiFi scan information from among the position tracking information received from the second electronic device to display on the touch screen thereof.

Referring to FIG. 6, the WiFi scan information on the second electronic device is displayed on the touch screen of the first electronic device. In the above described example, the APs displayed on the touch screen of the first electronic device are three APs, A, B, and C. In detail, the second electronic device senses three APs, A, B, and C, displays a BSSID, an SSID, a MAC address, and signal strength of each of the APs, and time of each of the APs is also displayed. Accordingly, a user having the first electronic device can easily determine a movement path along which the second electronic device moves on the identical floor by using the WiFi scan information on the second electronic device displayed on the touch screen of the first electronic device. Namely, since movement paths along which a person can move are limited in a specific building, a user using the first electronic device can confirm a movement path along which the second electronic device moves by using WiFi scan information on the second electronic device, which is displayed on the touch screen of the first electronic device.

Figure 7A:
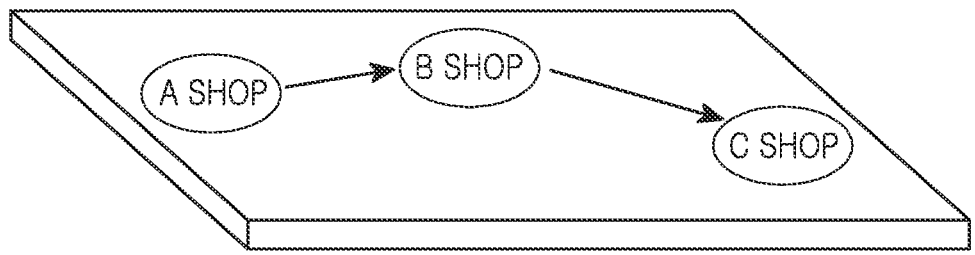
FIGS. 7A and 7B illustrate an example of displaying movement track information on an electronic device set on a touch screen according to an embodiment of the present disclosure.
Figure 7B:
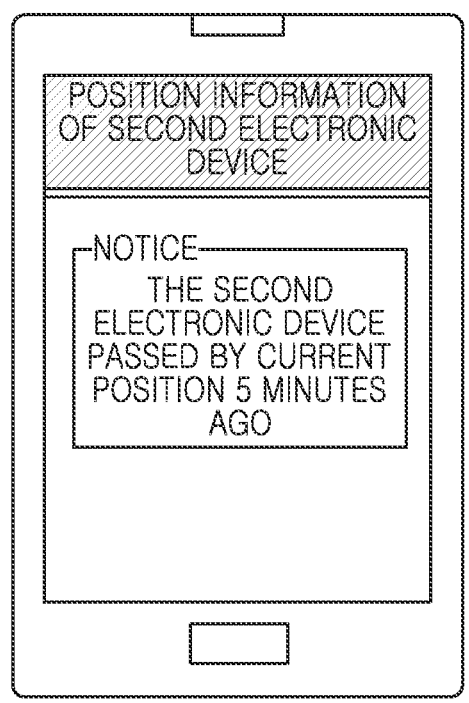

FIGS. 7A and 7B illustrate an example of displaying movement track information on a set electronic device according to an embodiment of the present disclosure. First, as shown in FIG. 7A, it is assumed that a movement path along which the second electronic device moves on a specific floor in a building of at least one floor reaches around C shop via A shop and B shop. Then, the first electronic device may compare WiFi scan information from among position tracking information received from the second electronic device and position information received from at least one AP to determine whether the first and second devices are located at the same position. In the above described example, the first electronic device is assumed to be at A shop on the same floor with the second electronic device.

Referring to FIG. 7B, the first electronic device may display information that the second electronic device has been at A shop by using at least one of information on at least one AP, at least one AP identifying factor, signal strength, and time information, which are currently scanned. For example, the first electronic device may display on the touch screen thereof a notice message such as "the second electronic device passed the current position five minutes ago". Then, a user using the first electronic device confirms the notice message displayed on the touch screen thereof to easily move to a position of the second electronic device. In the above described example, the user of the first electronic device may confirm that the second electronic device passed by A shop five minutes ago and continuously moves along another movement path. Namely, since movement paths along which a person can move are limited in a specific building, the user using the first electronic device narrows a search range down to a position at which the second electronic device is located, while moving along several set movement paths.

In a room where GPS position information may not be received, position information on the two electronic devices may not be mutually confirmed without constructing additional infrastructure. In detail, the above described satellite navigation system is difficult to be used in a place such as a room where a satellite signal is weak. Accordingly, an inside positioning system is developed, but, in order to receive position information by using an indoor electronic device, a particular device is required to be added in a room or a positioning infrastructure is required to be constructed in advance in a room where positioning is to be performed. However, it is burdensome in expense and time to equip all the indoor environments with these kinds of devices. However, the first electronic device according to the present disclosure may receive position tracking information on the second electronic device from the second electronic device even in a room where an infrastructure is not constructed in advance, and confirm a movement path in a case where the first and second electronic devices are located on different floors.

Figure 8:
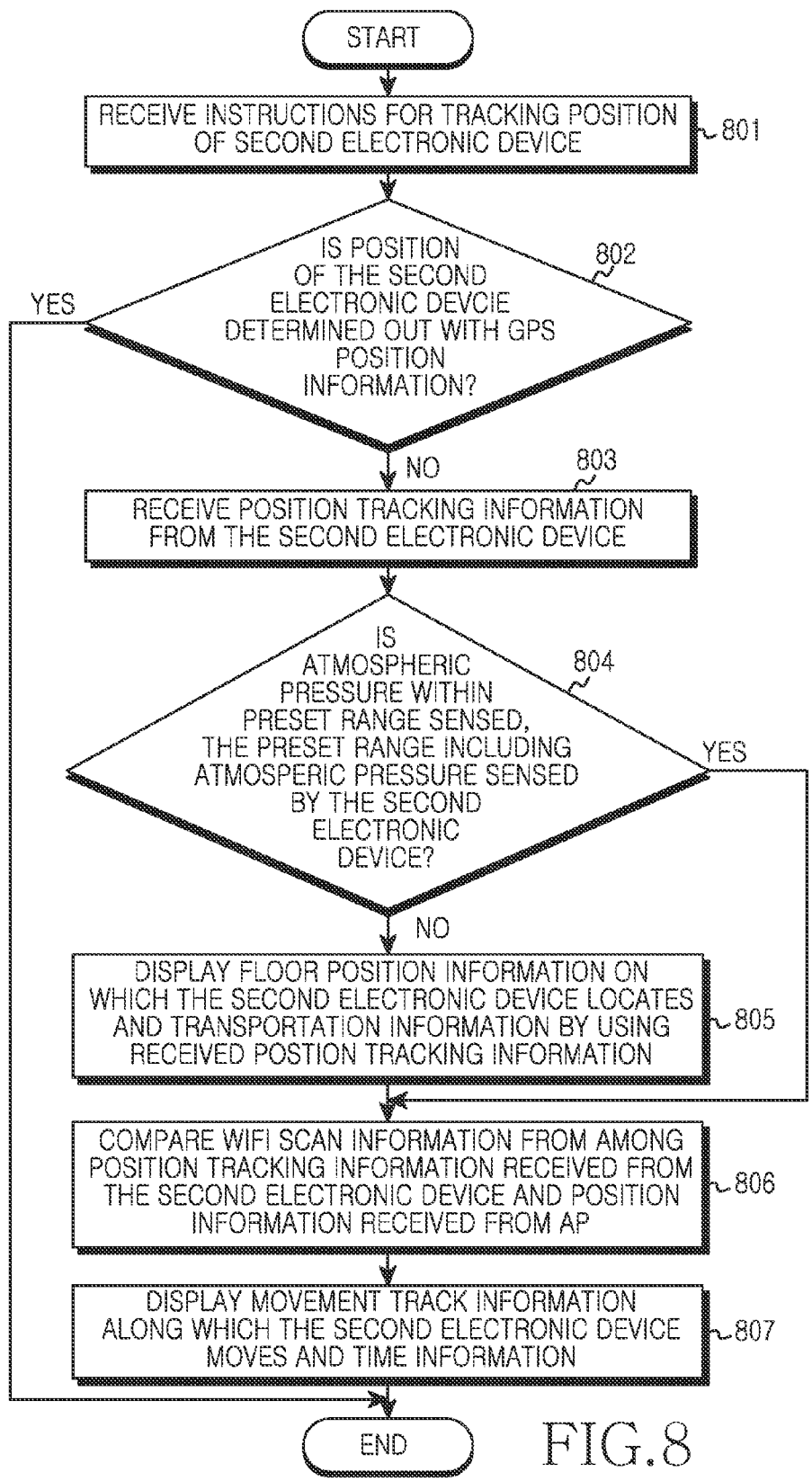
FIG. 8 is a flowchart illustrating an operation sequence of an electronic device displaying position information on a set device according to an embodiment of the present disclosure.

FIG. 8 is a flowchart illustrating an operation sequence of an electronic device displaying position information on a set device according to an embodiment the present disclosure. First, as shown in FIG. 8, a first electronic device may receive instructions for tracking a position of a second electronic device at operation 801. In detail, if the first electronic device confirms to be beyond a communication coverage area while performing communication with the second electronic device, the first electronic device may display on a touch screen thereof a notice message indicating that the second electronic device is beyond the communication coverage area. Then, the first electronic device may receive position tracking instructions for tracking a position of the second electronic device.

Thereafter, the first electronic device may determine whether a position of the second electronic device is determined with GPS position information at operation 802. In detail, the first electronic device may determine whether the position of the second electronic device is determined by using a satellite navigation system.

When determining that the position of the second electronic device is not able to be determined with the GPS position information, the first electronic device may receive position tracking information from the second electronic device at operation 803. In detail, the first electronic device may receive the position tracking information from the second electronic device by using WiFi, 3G, 4G networks, etc. Here, the position tracking information may be defined as sensor information sensed by the second electronic device and WiFi scan information. In detail, the first electronic device may receive, from the second electronic device, at least one of atmospheric pressure information, angular velocity information, acceleration information, and time information, which are sensor information sensed by the second electronic device.

Then, the first electronic device may determine whether atmospheric pressure within a preset range is sensed, the preset range including an atmospheric pressure sensed by the second electronic device at operation 804. In detail, the first electronic device may confirm the atmospheric pressure information included in sensor information from among position tracking information received from the second electronic device to determine whether the atmospheric pressure within the preset range is sensed. Here, the atmospheric pressure information indicates the atmospheric pressure information sensed by the second electronic device, and the first electronic device may compare the self-sensing atmospheric pressure and the atmospheric pressure sensed by the second electronic device. Then, the first electronic device may determine whether the atmosphere pressure within the preset range is sensed, the preset range including the atmospheric pressure sensed by the second electronic device.

If the first electronic device does not sense the atmospheric pressure within in the preset range, the preset range including the atmospheric pressure sensed by the second electronic device, the first electronic device may display information on a floor position at which the second electronic device is located and transportation information by using position tracking information at operation 805. In detail, the first electronic device may compare self-sensing atmospheric pressure and the atmospheric pressure received from the second electronic device to determine whether the first and second electronic devices are located on the same floor. Here, the first electronic device may confirm angular velocity information and acceleration information received from the second electronic device to estimate a path along which the second electronic device moves. In detail, the first electronic device confirms the angular velocity information and the acceleration information sensed by the second electronic device, to estimate the path along which the second electronic device moves to another floor in a building. For example, the first electronic device confirms angular velocity information and acceleration information received from the second electronic device to determine whether the second electronic device moves to the other floor by an elevator or stairs.

Then, the first electronic device may compare WiFi scan information from among position tracking information received from the second electronic device and position information received from an AP at operation 806. Namely, the first electronic device may receive, from the second electronic device, at least one of information on at least one AP, at least one AP identifying factor, signal strength, and time information, which are the WiFi scan information scanned by the second electronic device. Here, the at least one AP factor may be defined as at least one of a BSSID, an SSID, and a MAC address. In detail, the first electronic device may receive at least one of information on at least one AP, at least one AP identifying factor, signal strength, and time information, scanned by the second electronic device to confirm the position information on the second electronic device. First, the first electronic device may compare position information received from the at least one AP and the WiFi scan information from among the position tracking information received from the second electronic device. Here, the position information received from the at least one AP by the first electronic device may be defined as at least one of information on the at least one scanned AP, at least one AP identifying factor, signal strength, and time information. Namely, the first electronic device may compare the position information received from at least one AP and the WiFi scan information received from the second electronic device.

Then, the first electronic device may display information on a movement track along which the second electronic device moves and time information that the second electronic device moves at operation 807. In detail, the first electronic device may display on a touch screen thereof the movement track information indicating whether the second electronic device moves from a current position and time information when the second electronic device moves. For example, the first electronic device may display on the touch screen thereof whether the second electronic device moves to the current position and movement time together. Accordingly, a user using the first electronic device has an advantage in that the user may confirm position information on the second electronic device, which is beyond a communication coverage area of near field communication.

If, in the above described determining operation 802, the first electronic device is determined not to be able to determine a position of the second electronic device with GPS position information, all operations of the first electronic device are ended. In addition, in the above described determining operation 804, if it is determined that the first electronic device senses the atmospheric pressure within the preset range, the preset range including the atmospheric pressure sensed by the second electronic device, the first electronic device may repeat the above described operation 806.

Figure 9:
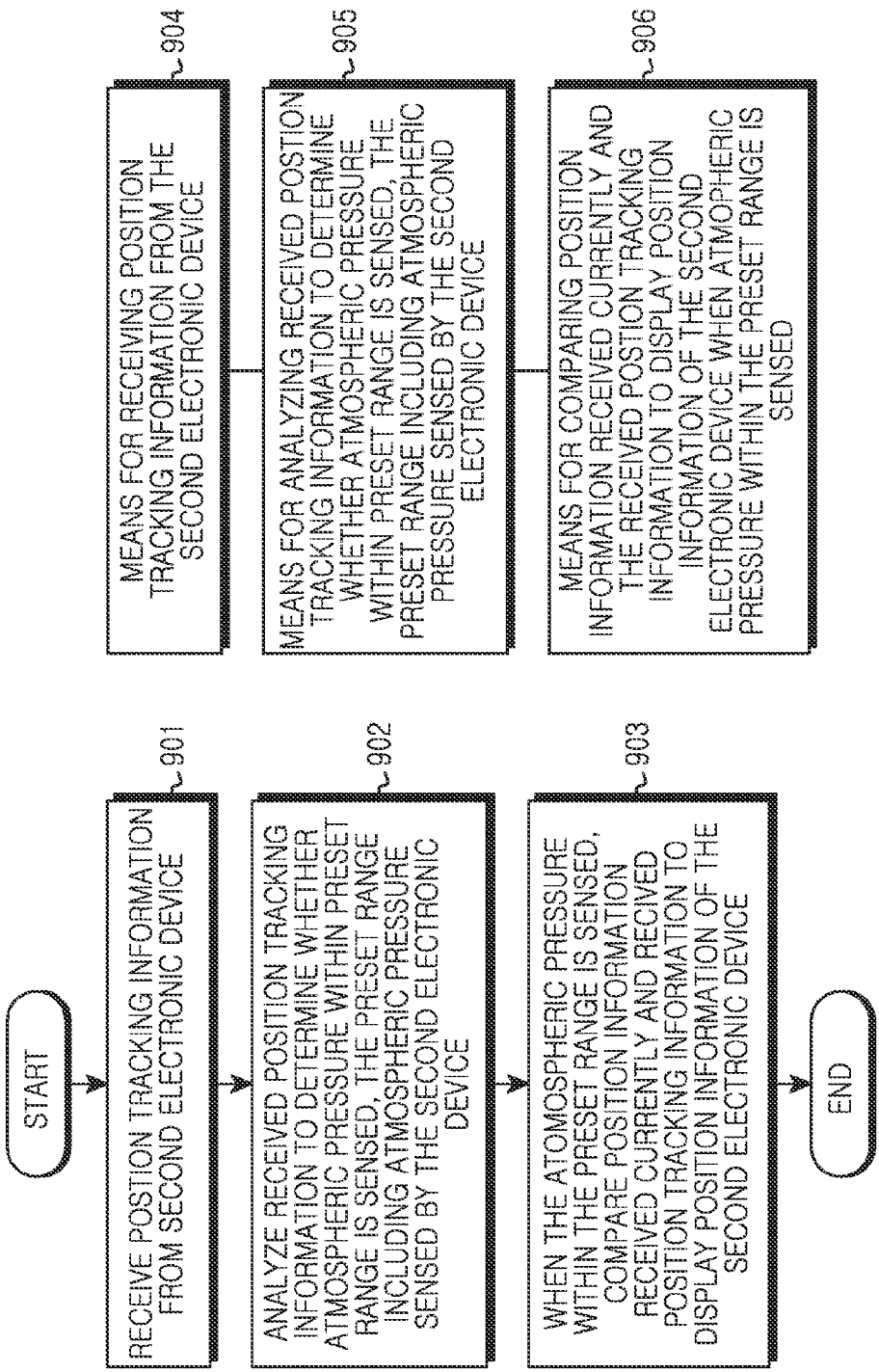
FIG. 9A is a flowchart of a method of displaying, by an electronic device, position information on a set device according to an embodiment of the present disclosure.
FIG. 9B is a device diagram illustrating an electronic device for displaying position information on a set device according to an embodiment of the present disclosure.

FIG. 9A is a flowchart illustrating a method of displaying, by an electronic device, position information on a set device according to an embodiment of the present disclosure. The first electronic device may receive position tracking information from the second electronic device at operation 901. First, the first electronic device may receive instructions for tracking a position of the second electronic device. In detail, if the first electronic device confirms that the second electronic device is beyond a communication coverage area while communicating with the second electronic device, the first electronic device may display on a touch screen thereof a notice message that the second electronic device is beyond the communication coverage area. Then, the first electronic device may receive position tracking instructions enabling to track a position of the second electronic device. Then, the first electronic device may determine whether the position of the second electronic device is determined with GPS position information. In detail, the first electronic device may determine whether the position of the second electronic device is determined by using a satellite navigation system. If it is determined that the first electronic device is not able to determine the position of the second electronic device by using the GPS position information, the first electronic device may receive position tracking information from the second electronic device. In detail, the first electronic device may receive the position tracking information from the second electronic device by using WiFi, 3G, and 4G networks. Here, the position tracking information may be defined as sensor information sensed by the second electronic device and WiFi scan information. In detail, the first electronic device may receive, from the second electronic device, at least one of atmospheric pressure information, angular velocity information, acceleration information, and time information, which are sensor information sensed by the second electronic device.

Then, the first electronic device may analyze the received position tracking information to determine whether atmospheric pressure within a preset range is sensed, the preset range including atmospheric pressure sensed by the second electronic device at operation 902. In detail, the first electronic device may confirm atmospheric pressure included in the sensor information from among the position tracking information received from the second electronic device to determine whether the atmospheric pressure within the preset range is sensed. Here, the atmospheric pressure information indicates the atmospheric pressure information sensed by the second electronic device, and the first electronic device may compare self-sensing atmospheric pressure and the atmospheric pressure sensed by the second electronic device. Then, the first electronic device may determine whether the atmospheric pressure within the preset range is sensed, the preset range including the atmospheric pressure sensed by the second electronic device.

If the atmospheric pressure within the preset range is sensed by the first electronic device, the first electronic device compares position information, which is being received, and position tracking information having been received to display position information on the second electronic device at operation 903. Namely, the first electronic device may receive at least one of information in at least one AP, at least one AP identifying factor, signal strength, and time information, scanned by the second electronic device. Here, the at least one AP identifying factor may be defined as at least one of a BSSID, an SSID, and a MAC address of the AP. In detail, the first electronic device receives at least one of information on at least one AP, at least one AP identifying factor, signal strength, and time information, scanned by the second electronic device, to confirm the position information on the second electronic device. First, the first electronic device may compare the position information received from the at least AP and WiFi scan information from among the position tracking information received from the second electronic device. Here, the position information which is received by the first electronic device from the at least one AP may be defined as at least one of information on at least one scanned AP, at least one identifying factor, signal strength, and time information. Namely, the first electronic device may compare position information received from the at least one AP and WiFi scan information received from the second electronic device. Then, the first electronic device may display information on a movement track along which the second electronic device moves and time information that the second electronic device moves. In detail, the first electronic device may display on a touch screen thereof movement track information indicating whether the second electronic device moves from a current position and time information when the second electronic device moves. For example, the first electronic device may display on the touch screen thereof whether the second electronic device moves to the current position and movement time together. Accordingly, a user using the first electronic device has an advantage in that the user may confirm the position information on the second electronic device, which is beyond the communication coverage area of near field communication.

FIG. 9B is a device diagram illustrating an electron device for displaying position information on a set device according to an embodiment of the present disclosure. First, the first electronic device may include a means 904 for receiving position tracking information from the second electronic device. In detail, the means 904 may receive the position tracking information from the second electronic device by using WiFi, 3G, and 4G networks. Here, the position tracking information may be defined as sensor information sensed by the second electronic device and WiFi scan information. In detail, the means 904 may receive, from the second electronic device, at least one of atmospheric pressure information, angular velocity information, and time information, which are sensor information sensed by the second electronic device. The means 904 may be a communication module.

The first electronic device may include a means 905 for analyzing the received position tracking information to determine whether atmospheric pressure within a preset range is sensed, the preset range including atmospheric pressure sensed by the second electronic device. In detail, the means 905 confirms atmospheric pressure information included in sensor information from among the position tracking information received from the second electronic device to determine whether the atmospheric pressure within the preset range is sensed. Here, the atmospheric pressure information indicates the atmospheric pressure information sensed by the second electronic device, and the means 905 may compare the atmospheric pressure information currently sensed by the first electronic device and the atmospheric pressure information sensed by the second electronic device. Then, the means 905 may determine whether atmospheric pressure within the preset range is currently sensed, the preset range including the atmospheric pressure sensed by the second electronic device. The means 905 may be a processor unit.

The first electronic device may include a means 906 to compare position information, which is being received, and position tracking information having been received, and display position information on the second electronic device, when the atmospheric pressure within the preset range is sensed. In detail, the means 906 may display movement track information indicating whether the second electronic device moves from a current position and time information when the second electronic device moves. For example, the means 906 may display whether the second electronic device moves to the current position and movement time together. Accordingly, a user using the first electronic device has an advantage in that the user may confirm the position information on the second electronic device, which is beyond the communication coverage area of near field communication. The means 906 may be a touch screen.

Figure 10:
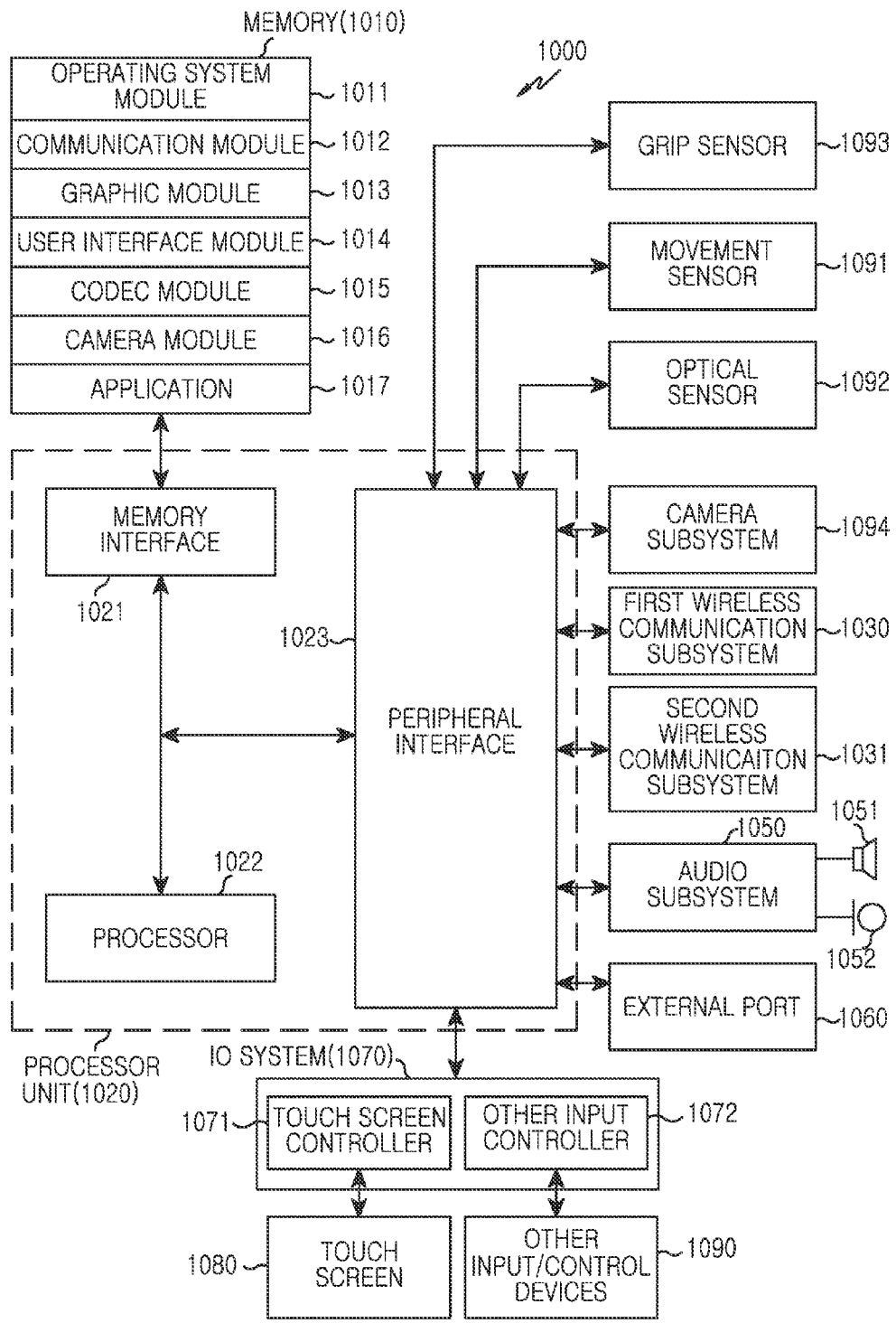
FIG. 10 is a block diagram illustrating a configuration of an electronic device according to an embodiment of the present disclosure.

FIG. 10 is a block diagram illustrating a configuration of an electronic device according to an embodiment of the present disclosure. The electronic device 1000 may be a portable electronic device such as a portable terminal, a mobile phone, a mobile pad, a media player, a tablet computer, a handheld computer, or a personal digital assistant. The electronic device 1000 may also be any portable electronic device including a device into which two or more functions from among the above described devices are combined.

The electronic device 1000 includes a memory 1010, a processor unit 1020, a first wireless communication subsystem 1030, a second wireless communication subsystem 1031, an external port 1060, an audio subsystem 1050, a speaker 1051, a microphone 1052, an Input/Output (IO) system 1070, a touch screen 1080, and other input/control units 1090. A plurality of the memory 1010 and the external port 1060 may be employed.

The processor unit 1020 may include a memory interface 1021, one or more processors 1022, and a peripheral interface 1023. In some cases, the entire processor unit 1020 may be referred to as a processor. The processor unit 1020 according to the present disclosure analyzes the received position tracking information to determine whether atmospheric pressure within a preset range is sensed, the preset range including the atmospheric pressure sensed by the second electronic device. Also, the processor unit 1020 confirms that the second electronic device is beyond a communication coverage area where communication is possible, confirms atmospheric pressure included in sensor information from among the received position tracking information, compares the confirmed atmospheric pressure with the sensed atmospheric pressure, and determine whether atmospheric pressure within the preset range is sensed, the preset range including the confirmed atmospheric pressure. Furthermore, when atmospheric pressure within the preset range is not sensed, the preset range including the atmospheric pressure sensed by the second electronic device, the processor unit 1020 may confirm sensor information from among the received position tracking information, sense atmospheric pressure within the preset range, the preset range including the atmospheric pressure sensed by the second electronic device, and compare WiFi scan information from among the position tracking information received from the second electronic device and position information received from at least one AP. Also, the processor unit 1020 determines whether the second electronic device is beyond the communication coverage area where communication with the second electronic device can be performed, and calls stored position tracking information when the second electronic device is beyond the communication coverage area.

The processor 1022 performs various functions for the electronic device 1000 by executing various software programs, and performs processes and controls for voice and data communications. In addition to these typical functions, the processor 1022 executes specific software modules (instruction sets) stored in the memory 1010 to perform various functions corresponding to the modules. Namely, the processor 1022 interworks with software modules stored in the memory 1010 to perform methods according to various embodiments of the present disclosure.

The processor 1022 may include one or more data processors, an image processor or a codec. The data processor, the image processor or the codec may be separately prepared. Also, the processor 1022 may be formed from various processors performing different functions. The peripheral interface 1023 connects the IO subsystem 1070 and various peripheral units of the electronic device 1000 to the processor 1022 and the memory 1010 (through the memory interface).

Various elements of the electronic device 1000 may be coupled by one or more communication buses (reference number not shown) or stream lines (reference number not shown).

The external port 1060 is used for connecting a portable electronic device (not shown) to another electronic device directly or indirectly through a network (for example, the internet, an intranet, or a wireless LAN, etc.). The external port 1060 includes, for example, a Universal Serial Bus (USB) port, or a FireWire port, but is not limited thereto.

A movement sensor 1091, an optical sensor 1092, and a grip sensor 19093 may be coupled to the peripheral interface 1023 and allow various functions to be enabled. For example, the movement sensor 1091, the optical sensor 1092, and the grip sensor 1093 may be coupled to the peripheral interface 1023 and allow detections of movement, charge transfer amount, and light from the outside to be enabled. Besides the movement sensor 1091, the optical sensor 1092, and the grip sensor 1093, other sensors, such as a positing system, a temperature sensor, or a bio sensor, are connected to the peripheral interface 1023 to perform related functions thereof.

A camera subsystem 1093 may perform a camera function such as image capturing and video clip recording.

The optical sensor 1092 may use a charged-coupled device or a complementary metal-oxide semiconductor device.

The one or more wireless communication subsystems 1030 and 1031 perform a communication function. The wireless communication subsystems 1030 and 1031 may include a radio frequency receiver and transceiver and/or an optical (for example, an infrared) receiver and transceiver. The first and second wireless communication subsystem 1030 and 1031 may be distinguished by a communication network through which the electronic device 1000 performs communication. For example, the communication network may include a communication subsystem designed to operate through, but not limited to, a Global System for Mobile communication (GSM) network, an Enhanced Data GSM Environment (EDGE) network, a Code Division Multiple Access (CDMA) network, a Wideband Code Division Multiple Access (W-CDMA) network, a Long Term Evolution (LTE) network, an Orthogonal Frequency Division Multiple Access (OFDMA) network, a Wireless Fidelity (Wi-Fi) network, a WiMax network and/or a Bluetooth network. The first and second wireless communication subsystems 1030 and 1031 may be combined to form one wireless communication subsystem.

The audio subsystem may be coupled to the speaker 105 and the microphone 1052 to perform input and output of an audio stream such as voice recognition, voice replication, digital recording and telephone functions. Namely, the audio subsystem 1050 communicates with a user through the speaker 1051 and the microphone 1052. The audio subsystem 1050 receives a data stream through the peripheral interface 1023 and the processor unit 1020, and converts the received data stream into an electric signal. The converted electric signal is transferred to the speaker 1051. The speaker 1051 converts and outputs the electric signal into a sound wave audible to humans. The microphone 1052 converts a sound wave transferred from a human or another sound source into an electrical signal. Also, the microphone 1052 operates when an object is sensed to be located within a preset distance from any one of at least two or more second sensors. The audio subsystem 1050 receives the converted electrical signal from the microphone 1050. The audio subsystem 1050 converts the received electrical signal into an audio data stream, and transmits the converted audio data stream to the peripheral interface 1023. The audio subsystem 1050 may include an attachable and detachable ear phone, a head phone or a head set.

The IO subsystem 1070 may include a touch screen controller 1071 and/or another input controller 1072. The touch screen controller 1071 may be coupled to the touch screen 1080. The touch screen 1080 and the touch screen controller 1071 may detect contact and movement thereon, or interruption of them by using, but is not limited to, any multi-touch sensing technology including a proximity sensor array or other elements as well as capacitive, resistive, infrared, and surface acoustic wave technologies in order to determine one or more contact points on the touch screen 1080. The other input controller 1072 may be coupled to the other input/control units 1090. The other input controller 1072 may be coupled to one or more buttons, a rocker switch, a thumbwheel, a dial, a stick and/or a pointing device such as a stylus.

The touch screen 1080 provides an input/output interface between the electronic device 1000 and a user. Namely, the touch screen is a medium transferring touch inputs from the user to the electronic device 1000, and showing outputs from the electronic device 1000 to the user. Namely, the touch screen 1080 shows visual outputs to a user. These visual outputs are represented as texts, graphics, videos, and combinations thereof.

As the touch screen 1080, various displays may be used. For example, but not limited to, a Liquid Crystal Display (LCD), a Light Emitting Diode (LED), an Active Matrix Organic Light Emitting Diode (AMOLED), or a Flexible LED (FLED) may be used. The touch screen 1080 of the present disclosure may compare position information, which is being received, and position tracking instructions having been received, when atmospheric pressure within a preset range is sensed, and display position information on the second electronic device. Furthermore, the touch screen 1080 may receive position tracking instructions for tracking a position of the second electronic device. Also the touch screen 1080 may display movement track information indicating whether the second electronic device moves from a current position and time information when the second electronic device moves.

The memory 1010 may be coupled to the memory interface 1021. The memory 1010 may include a fast random access memory such as one or more magnetic disk storage device, and/or a non-volatile memory, one or more of optical storage devices and/or a flash memory (for example, NAND, NOR).

The memory 1010 stores software. Software elements include an operating system module 1011, a communication module 1012, a graphic module 1013, a user interface module 1014, a codec module 1015, and a camera module 1016. Also, since the module, which is a software element, may be represented as a set of instructions, the module is referred to an instruction set. The module is also represented as a program. The operating system software 1011 (for example, an embedded operating system such as WINDOWS, LINUX, Darwin, RTXC, UNIX, OS X, or VxWorks) includes various software elements controlling a general system operation. This control of the general system operation indicates, for example, memory management and control, storage hardware (device) control and management, and power control and management. This operating system software also performs a function of allowing smooth communication between hardware (devices) and software elements (modules).

The communication module 1012 may enable communication with another electronic device such as a computer, a server and/or a portable terminal through the wireless communication subsystems 1030 and 1031 or the external port 1060. The communication module 1012 of the present disclosure may receive position tracking information from the second electronic device. Also, the communication module 1012 may transmit called position tracking information to the first electronic device.

The graphic module 1013 includes various software elements for providing and displaying graphics on the touch screen 1080. The term "graphics" is used as a meaning including a text, a web page, an icon, a digital image, a video, or an animation.

The user interface module 1014 includes various software elements related to a user interface, which include how a state of the user interface changes or under what condition a state of the user interface is changed.

The codec module 1015 may include software elements related to encoding and decoding of a video file. The codec module may include a video stream module such as a Moving Picture Experts Group (MPEG) module and/or an H204 module. Also the codec module may include a codec module for various audio files such as AAA, AMR, or WMA. The codec module 1015 also includes an instruction set corresponding to methods according to various embodiments of the present disclosure.

The camera module 1016 includes software elements related to a camera, which allow processes and functions related to a camera to be enabled.

The application module 1017 includes a browser, an email, an instant message, word processing, keyboard emulation, an address book, a touch list, a widget, Digital Right Management (DRM), voice recognition, voice replication, a position determining function, or a location based service.

In addition, various functions of the electronic device 1000 according to the present disclosure, as described above, and to be described below, may be executed by hardware and/or software and/or combinations thereof including one or more stream processors and/or an Application Specific Integrated Circuit (ASIC).

While the present disclosure has been shown and described with reference to various embodiments thereof, it will be understood by those skilled in the art that various changes in form and details may be made therein without departing from the spirit and scope of the present disclosure as defined by the appended claims and their equivalent.

What is claimed is:

1. A method of operating a first electronic device, the method comprising:
   receiving position tracking information at the first electronic device from a second electronic device;
   analyzing the received position tracking information at the first electronic device to determine whether a sensor information for the second electronic device's vertical position estimation within a preset range is sensed, the preset range including the sensor information; and
   when the atmospheric pressure in the preset range is sensed, comparing position information currently received and the received position tracking information at the first electronic device to display position information of the second electronic device.

2. The method of claim 1, further comprising:
   confirming at the first electronic device that the second electronic device is beyond a direct communication range with the second electronic device; and
   receiving position tracking instructions for tracking a position of the second electronic device at the first electronic device.

3. The method of claim 1, wherein the position tracking information comprises sensor information sensed by the second electronic device and Wireless Fidelity (WiFi) information.

4. The method of claim 3, wherein the sensor information comprises at least one of atmospheric information, angular velocity information, acceleration information, altitude information of Pedestrian Dead Reckoning (PDR) and time information, which are sensed by the second electronic device, the angular velocity information and the acceleration information being used for determining when the second electronic device moves between floors.

5. The method of claim 3, wherein the WiFi scan information comprises at least one of information on at least one Access Point (AP), at least one AP identifying factor, signal strength and time information, scanned by the second electronic device.

6. The method of claim 5, wherein the at least one AP identifying factor comprises at least one of a Basic Service Set IDentifier (BSSID), a Service Set IDentifier (SSID) and a Media Access Control (MAC) address of the AP.

7. The method of claim 1, wherein the determining of whether the atmospheric pressure within the preset range is sensed comprises:
   confirming the atmospheric pressure included in sensor information from among the received position tracking information;
   comparing the confirmed atmospheric pressure and the sensed atmospheric pressure; and
   determining whether an atmospheric pressure within the preset range is sensed, the preset range including the confirmed atmospheric pressure.

8. The method of claim 1, further comprising:
   confirming sensor information at the first electronic device from among the received position tracking information when the atmospheric pressure within the preset range is not sensed, the preset range including the atmospheric pressure sensed by the second electronic device; and
   confirming the sensor information at the first electronic device to display at least one of angular velocity information, acceleration information and time information sensed by the second electronic device.

9. The method of claim 1, wherein the comparing of the position information comprises:
   sensing atmospheric pressure within the preset range, the preset range including the atmospheric pressure sensed by the second electronic device;
   comparing Wireless Fidelity (WiFi) information from among the position tracking information received from the second electronic device and position information received from at least one Access Point (AP); and
   displaying movement track information indicating whether the second electronic device moves from a current position and time information when the second electronic device moves from the current position.

10. The method of claim 9, wherein the position information comprises at least one of information on at least one scanned AP, at least one AP identifying factor, signal strength, and time information.

11. The method of claim 10, wherein the at least one AP identifying factor comprises at least one of a Basic Service Set IDentifier (BSSID), a Service Set IDentifier (SSID) and a Media Access Control (MAC) address of the AP.

12. A method of operating a second electronic device, the method comprising:
   determining at the second electronic device whether the second electronic device is beyond a direct communication range with the first electronic device;
   accessing stored position tracking information at the second electronic device when the second electronic device is determined to be beyond the communication coverage area; and
   transmitting the called position tracking information at the second electronic device to the first electronic device.

13. The method of claim 12, wherein the position tracking information comprises sensed sensor information and Wireless Fidelity (WiFi) scan information.

14. The method of claim 13, wherein the sensor information comprises at least one of atmospheric pressure information, angular velocity information, acceleration information, altitude information of Pedestrian Dead Reckoning (PDR) and time information.

15. The method of claim 13, wherein the WiFi scan information comprises at least one of information on at least one Access Point (AP), at least one AP identifying factor, signal strength, and time information.

16. The method of claim 15, wherein the at least one identifying factor comprises at least one of a Basic Service Set IDentifier (BSSID), a Service Set IDentifier (SSID), and a Media Access Control (MAC) address of the AP.

17. A first electronic device comprising:
   a touch screen;
   a communication module configured to receive position tracking information from a second electronic device; and a processor unit operatively coupled to the communication module, the processor unit configured to perform operations comprising:
analyzing the received position tracking information to determine whether an atmospheric pressure within a preset range is sensed, the preset range including an atmospheric pressure sensed by the second electronic device,
comparing position information currently received and the received position tracking information, and
displaying the position information of the second electronic device via the touch screen, when the atmospheric pressure within the preset range is sensed.

18. The first electronic device of claim 17, wherein the processor unit confirms the second electronic device to be beyond a direct communication range with the second electronic device.

19. The first electronic device of claim 17, wherein the position tracking information comprises sensor information sensed by the second electronic device and Wireless Fidelity (WiFi) scan information.

20. The first electronic device of claim 19, wherein the sensor information comprises at least one of atmospheric pressure information, angular velocity information, acceleration information, and time information sensed by the second electronic device, the angular velocity information and the acceleration information being used for determining when the second electronic device moves between floors.

21. The first electronic device of claim 19, wherein the WiFi scan information comprises at least one of information on at least one Access Point (AP), at least one AP identifying factor, signal strength, and time information, scanned by the second electronic device.

22. The first electronic device of claim 21, wherein the at least one AP identifying factor comprises at least one of a Basic Service Set IDentifier (BSSID), a Service Set IDentifier (SSID) and a Media Access Control (MAC) address of the AP.

23. The first electronic device of claim 17, wherein the processor unit confirms atmospheric pressure information included in sensor information from among the received position tracking information, compares the confirmed atmospheric pressure and the sensed atmospheric pressure, and determines whether atmospheric pressure within the preset range is sensed, the preset range including the confirmed atmospheric pressure.

24. The first electronic device of claim 17,
wherein the processor unit confirms sensor information from among the received position tracking information, when the atmospheric pressure within the preset range is not sensed, the preset range including the atmospheric pressure sensed by the second electronic device, and
wherein the touch screen confirms the sensor information to display at least one of angular velocity information, acceleration information and time information sensed by the second electronic device.

25. The first electronic device of claim 17,
wherein the processor unit senses atmospheric pressure within the preset range, the preset range including the atmospheric pressure sensed by the second electronic device, and compares Wireless Fidelity (WiFi) information from among the position tracking information received from the second electronic device and position information received from at least one Access Point (AP), and
wherein the touch screen displays movement track information indicating whether the second electronic device moves from a current position and time information when the second electronic device moves from the current position.

26. The first electronic device of claim 25, wherein the position information comprises at least one of information on at least one scanned Access Point (AP), at least one AP identifying factor, signal strength, and time information.

27. The first electronic device of claim 26, wherein the at least one AP identifying factor comprises at least one of a Basic Service Set IDentifier (BSSID), a Service Set IDentifier (SSID) and a Media Access Control (MAC) address of the AP.

28. A second electronic device comprising:
a communication module; and
a processor unit operatively coupled to the communication module, the processor unit configured to perform operations comprising:
determining whether the second electronic device is beyond a direct communication range with the first electronic device, and accessing stored position tracking information when it is determined the second electronic device is beyond the communication coverage area, and
transmitting the called position tracking information to the first electronic device via the communication module.

29. The second electronic device of claim 28, wherein the position tracking information comprises sensed sensor information and Wireless Fidelity (WiFi) scan information.

30. The second electronic device of claim 29, wherein the sensor information comprises at least one of atmospheric pressure information, angular velocity information, acceleration information, and time information.

31. The second electronic device of claim 29, wherein the WiFi scan information comprises at least one of information on at least one Access Point (AP), at least one AP identifying factor, signal strength, and time information.

32. The second electronic device of claim 29, the at least one AP identifying factor comprises at least one of a Basic Service Set IDentifier (BSSID), a Service Set IDentifier (SSID), and a Media Access Control (MAC) address of the AP.

* * * * *